April 2, 1963  I. L. GLERUM  3,084,297
FORCE MEASURING DEVICE
Filed Nov. 28, 1958

INVENTOR.
IRVIN L. GLERUM
BY *Elliott & Pastoriza*
ATTORNEYS

United States Patent Office 3,084,297
Patented Apr. 2, 1963

3,084,297
FORCE MEASURING DEVICE
Irvin L. Glerum, Canoga Park, Calif., assignor to W. C. Dillon & Company, Inc., a corporation of California
Filed Nov. 28, 1958, Ser. No. 776,833
6 Claims. (Cl. 336—30)

This invention generally relates to a force measuring device and more particularly concerns an apparatus for measuring either compressive or tensile loads as a function of the deflection of a member in response to the forces imposed thereupon.

Force measuring devices or dynamometers, as they are commonly referred to in the art, are presently available in various conventional constructions, for example, as set forth in Patent Nos. 2,285,500 and 2,287,299. Such dynamometers although adequately performing the intended function are relatively expensive to manufacture and necessarily consist of several precision machined parts.

With the above in mind, it is an object of the present invention to provide a force measuring device which may be simply constructed with a minimum number of parts, and yet which is durable and accurate in its operation.

Another object of the present invention is to provide a force measuring apparatus, which embodies simplified transducer means for yielding an indication of the forces imposed.

Another object of the present invention is to provide a force measuring apparatus, which is rugged in its construction and which will accommodate for measurement an unusually wide range of imposed loads.

Another object of the present invention is to provide a force measuring apparatus, which by a simple adjustment will yield readings of either a compressive or tensile load.

Still another object of the present invention is to provide a force measuring apparatus which may be manufactured with relatively few tooling operations.

These and other objects and advantages of the present invention are generally achieved by providing in a force measuring device according to the present invention a member having its end portions adapted, respectively, for coupling to force exerting means. The member additionally has an intermediate portion of reduced cross section so as to flex in response to force imposed on the end portions and so as to effect relative movement between the end portions in response to and in accordance with the flexure of the intermediate portion.

Transducer means are coupled co-operatively to the respective end portions for indicating the relative movement thereof.

A better understanding of the present invention will be had by reference to the drawings illustrating merely certain embodiments thereof, and in which.

Figure 1:
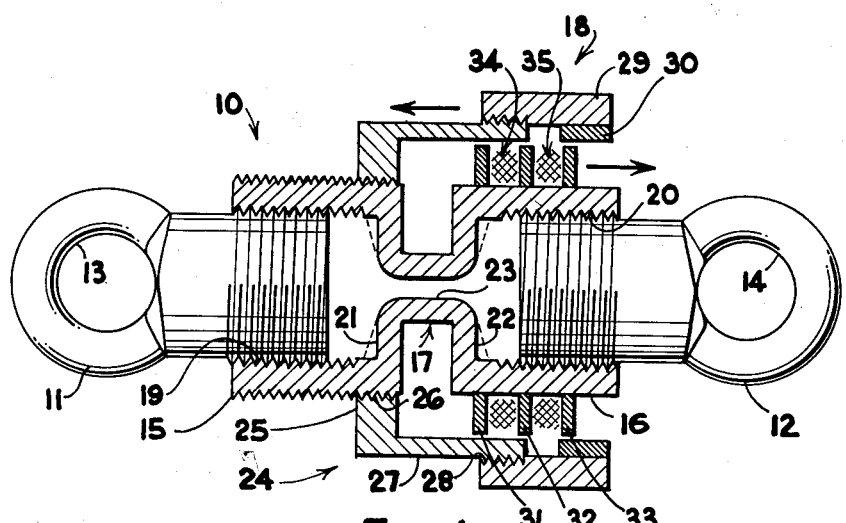
FIGURE 1 is a sectional view of a force measuring device according to the present invention.

Referring now to the drawings, there is shown in FIGURE 1 a member 10 interposed between coupling members 11 and 12. The coupling members 11 and 12 include, respectively, bores 13 and 14 to enable connection to imposed loads either in tension or compression with respect to the member 10.

The member 10 embodies a cylindrical member 15 forming one end portion thereof and a cylindrical member 16 forming the opposite end portion thereof. Intermediate of the cylindrical members 15 and 16 and integrally formed therewith is a reduced diameter section or neck portion generally designated by the numeral 17. Cylindrical members 15 and 16 have co-operatively coupled thereto transducer means 18, which will be more fully described as the specification proceeds.

The cylindrical member 15 is threaded at 19 to the coupling member 11; similarly, the cylindrical member 16 is threaded at 20 to the coupling member 12.

It is apparent from the view of FIGURE 1 that the cylindrical member 15 and the cylindrical member 16 have side walls integral with the walls of the neck portion 17. Thus, the neck portion 17 has radially extending end walls 21 and 22 and axially extending side walls 23. The end walls 21 connect with the cylindrical member 15, and similarly, the end walls 22 connect with the cylindrical member 16. Thus, the overall construction for the member 10 is in the form of an "hour glass" structure.

It will be appreciated that as a consequence of this type of construction, any loads imposed upon the coupling members 11 and 12 will tend to flex the neck portion 17 so as to cause the end walls 21 and 22 to move towards the dotted line positions as shown in FIGURE 1. Of course, compressional loads would effect a reverse movement. It has been found that this movement is relatively linear over a wide range of loads with very little requirement for compensating adjustments.

The transducer means 18 which is provided in order to yield a determinable measurement of the deflection of the neck portion 17, consists of an annular member 24 having a flanged portion 25 threaded as at 26, to the cylindrical member 10. The member 24 may be disposed in various axial positions on the member 10 in order to enable the overall force measuring device to be used for either tension or compression loads, as will become clearer as the specification proceeds. The member 24 further includes cylindrical side walls 27 having outer threading 28. The threading 28 enables the coupling of a sleeve member 29 carrying on its inner surface a ring member 30. In a preferred construction, the side walls 27 and the ring member 30 are formed of ferro-magnetic material while the sleeve member 29 is formed of a non-magnetic material, for example, brass or the like.

The transducer means further includes rigidly coupled to the cylindrical member 16 a plurality of annular plates 31, 32, and 33. The plates 31, 32, and 33 are also preferably formed of ferro-magnetic material. Disposed about the cylindrical member 16 and in between the plates 31 and 32 are the primary and secondary coils of a first transformer generally designated by the numeral 34. Similarly between the plates 32 and 33 are the primary and secondary coils of a second transformer generally designated by the numeral 35.

The operation of the force measuring device of FIGURE 1 may now be described. In the position of FIGURE 1, the distal end portion of the side walls 27 are disposed in encircling relationship about the transformer coils 34 and radially adjacent the plates 31 and 32. With such a construction, it will be apparent to those skilled in the art, that a maximum output will be obtained from the transformer as partially defined by the coils 34 thereof. On the other hand, the magnetic ring 30 secured to the sleeve member 29 is axially displaced from the transformer partially defined by coils 35 and more particularly is axially displaced from the plate member 32.

In response to a tensional load being imposed on the coupling members 11 and 12, the neck portion 17 will tend to elongate by flexing of the walls 21 and 22 as indicated by the dotted lines in the view of FIGURE 1. With such elongation, the cylindrical members 15 and 16 will necessarily be displaced apart a given distance.

In response to this movement, the member 24 will move in the direction of the arrow as shown towards the left portion of FIGURE 1, while the plates 31 through 33 and the coupled coil means 34 and 35, will move in the direction of the arrow as shown towards the right in accordance with the view of FIGURE 1. As a consequence of this relative movement between the cylindrical members 15 and 16, the ring member 30 will tend to move more into radial alignment with the plate members 33 and 32 while the distal end of the side walls 27 will tend to move out of radial alignment with the plate members 31 and 32. As a consequence, the output from the transformer as partially defined by the coils 34 will decrease while the output from the transformer as partially defined by the coils 35 will increase. By employing a circuit, for example, as disclosed in applicant's co-pending application entitled "Dynamometer," filed October 6, 1958, and assigned Serial Number 765,593, now Patent No. 3,033,032, it is apparent that a differential electrical indication may be attained as a function of the relative outputs of the two transformers and in accordance with the relative movement of the members 15 and 16.

Figure 2:
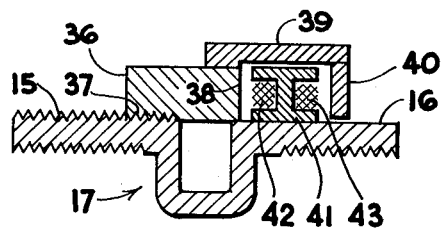
FIGURE 2 is a modification of the force measuring device of FIGURE 1.

In FIGURE 2 a modified construction is shown. A movable member 36 is threadingly coupled at 37 to the cylindrical member 15. The member 36 embodies an inner end portion 38 formed of ferro-magnetic material to which is coupled an annular member 39, preferably formed of a non-magnetic material such as brass or the like. Mounted within the annular member 39 at the free end thereof is an annular member 40 formed of magnetic material.

The plate means 31, 32, and 33 of FIGURE 1 are replaced in the construction of FIGURE 2 with an annular member 41 having an I-beam cross section. Member 41 accommodates in spaced relationship first transformer coil means 42 and second transformer coil means 43. It will be evident that with this type of construction as a tension load is applied to the members 11 and 12, the end portion 38 will be moved away from the member 41 while the annular member 40 will be moved closer to the member 41. In consequence, the output from the transformer coils 43 will increase while the output from the transformer coils 42 will decrease.

Figure 3:
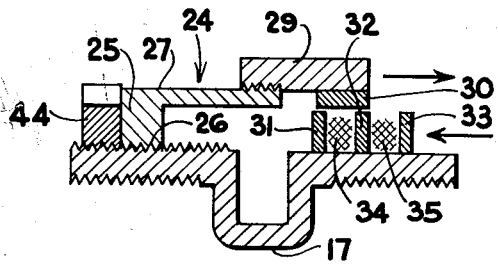
FIGURE 3 illustrates adjustment of certain parts of FIGURE 1 in order to enable the force measuring device of FIGURE 1 to be employed in conjunction with compressive loads.

It will further be appreciated, as is clearly shown in FIGURE 3, that the force measuring device of the present invention, as shown in FIGURE 1, may be readily adjusted for use in conjunction with compression loads as heretofore mentioned. Thus, in FIGURE 3, the member 24 has merely been moved to the left a slight distance such that the ring member 30 is in radial alignment with the plate member 32. In consequence, upon application of a compressive load, the ring member 30 will be moved in the direction of the arrow axially away from its aligned position with the plate member 32 to a point approaching radial alignment with the plate member 33 whereby the output from the transformer having coils 35 will be increased whereas the output from the transformer having coils 34 will be decreased.

A similar adjustment with respect to the modification shown in FIGURE 2 might be made in order to enable this modification to be adaptable for compressive loads. Thus, the end portion 38 could be spaced away from the member 41 whereas the annular member 40 could be spaced adjacent the member 41 such that upon compressive loads being applied to the coupling members 11 and 12, the end portion 38 would move towards the member 41 and the annular member 40 would move away from the member 41. As a consequence, the output of the transformer having coils 43 would decrease, while the output of the transformer having coils 42 would increase.

In order to establish the proper axial position of the member 24 or 36, a lock nut 44 (as shown in FIGURE 3, for example) may be threaded to the member 15. Lock nut 44 may also serve to enable tare adjustments to be made by moving member 24 or 36 to re-attain zero electrical reading and then securing the nut to assure accuracy.

It will be apparent from the above that the present invention provides a simplified, rugged construction for a force measuring apparatus susceptible of economical construction and enabling incorporation with remote reading indicating means.

It will be appreciated that many modifications and changes may be made in the illustrative embodiment shown without departing from the spirit and scope of the invention as set forth in the following claims.

What is claimed is:

1. A force measuring device comprising, in combination: an integral tubular member having its end portions adapted, respectively, for coupling to force exerting means, said member having an intermediate portion of reduced cross section connected by opposing inner endwalls to said respective, end portions, said inner endwalls being designed to flex relative to said intermediate portion in response to said force so as to effect an opposite movement of each of said end portions; and, transducer means connected co-operatively to said, respective, end portions for indicating said movement.

2. A force measuring device comprising, in combination: an integral annular member having its end portions adapted, respectively, for coupling to force exerting means, said member having an intermediate portion of reduced cross section connected by opposing inner endwalls to said respective, end portions, said inner endwalls being designed to flex relative to said intermediate portion in response to said force so as to effect an opposite movement of each of said end portions; and, differential transformer means co-operatively connected partially to each of said end portions, whereby said movement between said end portions effects a change in the output of said differential transformer means.

3. A force measuring device comprising, in combination: an integral cylindrical member having its end portions adapted, respectively, for coupling to force exerting means, said member having an intermediate portion of reduced cross section connected by opposing inner endwalls to said respective, end portions, said inner endwalls being designed to flex relative to said intermediate portion in response to said force so as to effect an opposite movement of each of said end portions; a pair of spaced annular ferro-magnetic plate members rigidly secured to one end portion; transformer coil means disposed about said one end portion between said pair of plates; means connected to said other end portion and magnetically co-operating with said plates to vary the output of said transformer coil means in response to said movement.

4. A force measuring device according to claim 3, in which said member is tubular.

5. A force measuring device comprising, in combination: an integral tubular member having its end portions adapted, respectively, for coupling to force exerting means, said member having an intermediate portion of reduced cross section connected by opposing inner endwalls to said respective end portions, said inner endwalls being designed to flex relative to said intermediate portion in response to said force so as to effect an opposite movement of each of said end portions; annular ferro-magnetic means connected to one end portion; transformer coil means carried by said annular means; and, means connected to said other end portion and magnetically co-operating with said ferro-magnetic means to vary the output of said transformer coil means in response to said movement.

6. A force measuring device comprising, in combination: an integral tubular member having its end portions adapted, respectively, for coupling to force exerting means, said member having an intermediate portion of reduced cross section connected by opposing inner endwalls to said respective, end portions, said inner endwalls being designed to flex relative to said intermediate portion in response to said force so as to effect an opposite movement of each of said end portions; an annular magnetic member of I-beam cross section encircling and coupled to one end portion; differential transformer coil means carried by said magnetic member, respectively, on each side thereof; and, means connected to said other end portion and magnetically co-operating with said magnetic member to vary the output of said differential transformer coil means in response to said movement.

References Cited in the file of this patent

UNITED STATES PATENTS

| | | |
|---|---|---|
| 2,276,843 | Hathaway | Mar. 17, 1942 |
| 2,396,394 | Shaw | Mar. 12, 1946 |
| 2,539,833 | Hathaway | Jan. 30, 1951 |
| 2,922,971 | Jeglum | Jan. 26, 1960 |

FOREIGN PATENTS

| | | |
|---|---|---|
| 226,046 | Switzerland | June 16, 1943 |
| 743,325 | Germany | Dec. 23, 1943 |
| 969,884 | France | May 31, 1950 |